US012013274B2

(12) United States Patent
Braunschweig et al.

(10) Patent No.: US 12,013,274 B2
(45) Date of Patent: Jun. 18, 2024

(54) INLET VALVE FOR HOUSEHOLD APPLIANCES WITH VARIABLE ATTACHMENT OF A FLOWMETER (71) Applicant: Sanhua Aweco Appliance Systems GmbH, Neukirch (DE)

(72) Inventors: Martin Braunschweig, Langenargen (DE); Kurt Wallerstorfer, Strasswalchen (AT); Zuo Wang, Immenstaad am Bodensee (DE)

(73) Assignee: Sanhua Aweco Appliance Systems GmbH, Neukirch (DE)

( * ) Notice: Subject to any disclaimer, the term of this patent is extended or adjusted under 35 U.S.C. 154(b) by 108 days.

(21) Appl. No.: 17/343,278

(22) Filed: Jun. 9, 2021

(65) Prior Publication Data
US 2022/0003587 A1    Jan. 6, 2022

(30) Foreign Application Priority Data

Jun. 12, 2020   (EP) .................................... 20179774

(51) Int. Cl.
*G01F 15/00*   (2006.01)
*G01F 15/18*   (2006.01)
(52) U.S. Cl.
CPC .......... *G01F 15/005* (2013.01); *G01F 15/185* (2013.01)
(58) Field of Classification Search
CPC ...... G01F 15/005; G01F 15/185; G01F 1/115; G01F 15/18; A47L 15/4217;
(Continued)

(56) References Cited

U.S. PATENT DOCUMENTS 10,508,753 B2 * 12/2019 Ravedati ............... F16K 37/005
2007/0289647 A1   12/2007 Ravedati
2017/0145667 A1    5/2017 Gal et al.

FOREIGN PATENT DOCUMENTS

CN    201548280 U    8/2010
CN    206095340 U    4/2017
(Continued)

OTHER PUBLICATIONS

DE-202018100215-U1 Machine translation (Year: 2018).*
(Continued)

*Primary Examiner* — Matthew G Marini
*Assistant Examiner* — Leo T Hinze
(74) *Attorney, Agent, or Firm* — Fitch, Even, Tabin & Flannery LLP (57) ABSTRACT The present invention provides a flowmeter for determining a fluid flow rate through an associated valve assembly, the flowmeter comprising a housing; a sensor arrangement disposed in the housing, the sensor arrangement comprising at least one sensor configured to detect a quantity indicative of the fluid flow rate through the valve assembly; and an coupling portion provided at the housing and configured to engage with an associated counter-coupling portion of the valve assembly for selectively attaching the flowmeter to the valve assembly in an orientation selectable from a group comprising at least a first orientation and a second orientation. The present invention also provides a valve assembly having a counter-coupling portion configured to receive an associated coupling portion of the flowmeter for selectively attaching the flowmeter to the valve assembly in any one of at least a first orientation and a second orientation. An inlet valve provided by the present invention comprises the flowmeter and the valve assembly, wherein the flowmeter is
(Continued)

attached to the valve assembly in either one of the first or second orientation.

20 Claims, 8 Drawing Sheets

(58) Field of Classification Search
CPC . A47L 15/4214; D06F 2103/14; D06F 34/14; D06F 39/088; F16K 11/24; F16K 37/005
See application file for complete search history.

(56) References Cited

FOREIGN PATENT DOCUMENTS

| | | | |
|---|---|---|---|
| CN | 206974602 U | 2/2018 | |
| DE | 20 2018 100215 U1 | 4/2018 | |
| EP | 1980826 A2 | 10/2008 | |
| EP | 2098835 A1 | 9/2009 | |
| EP | 2327922 A1 | 6/2011 | |
| EP | 3718457 A2 * | 10/2020 | ......... A47L 15/4217 |
| WO | 97/19318 A2 | 5/1997 | |
| WO | 2019/069187 A1 | 4/2019 | |
| WO | 2019/104175 A1 | 5/2019 | |

OTHER PUBLICATIONS

EPO; App. No. 20179774.3; European Search Report dated Dec. 7, 2020.
International Search Report; Application No. PCT/CN2021/099431; dated Sep. 9, 2021.
International Preliminary Report on Patentability and Written Opinion; Application No. PCT/CN2021/099431; dated Sep. 10, 2021.

* cited by examiner

INLET VALVE FOR HOUSEHOLD APPLIANCES WITH VARIABLE ATTACHMENT OF A FLOWMETER

CROSS-REFERENCE TO RELATED APPLICATION

The present application claims the benefit of priority of European Patent Application No. 20179774.3 filed on Jun. 12, 2020, the content of which is incorporated herein by reference in its entirety.

FIELD OF THE INVENTION

The present invention in general relates to an improved inlet valve for a household appliance. The inlet valve comprises a valve assembly and a flowmeter attachable to the valve assembly in an orientation selectable from a group comprising at least a first orientation and a second orientation.

BACKGROUND ART

Household appliances, such as washing machines or dishwashers, which operate using water, typically comprise an inlet valve for regulating and adjusting the amount of water supplied to the household appliance from an external water source, such as a water tap. For this purpose, inlet valves known in the art generally comprise inlet ducts, outlet ducts, controllable valves and means for determining a flow rate of water through the inlet valve.

There are various challenging technical requirements for the design of inlet valves for household appliances. In particular, it is a general constraint that the amount of space available inside the household appliance is limited. When in operation, household appliances, in particular washing machines may cause significant vibrations which puts increased demands on the assembly of the individual components. Furthermore, the components of the household appliance have to be able to operate in an environment potentially containing large amounts of water.

German utility model DE 20 2018 100 215 U1 discloses an inlet valve in form of a solenoid valve apparatus comprising a hollow valve body with an inlet and two outlets for a flow of a fluid, especially water. Between the inlet and the two outlets, a chamber is defined in the valve body, in which a valve seat is provided. A valve body is provided in the valve seat for controlling the communication between the inlet and outlet. In the area of the inlet of the valve body, an integral flow line is provided for the flow of the fluid, wherein the flow line is configured to accommodate a turbine-flow meter. The solenoid valve apparatus further comprises a receiving space for accommodating a control circuit board. The receiving space is located in the area of the flow line, inside which a plate seat is formed. The plate seat is located outside of the flow line and is configured to accommodate the control circuit board. The control circuit board itself is equipped with a sensor for receiving a signal provided by the turbine flow meter. The valve body and the receiving space are unitarily formed from molded plastic. A double wall is formed by a portion of a peripheral wall, which defines the plate seat, and by a wall of the flow line. The portion of the peripheral wall portion is separated from the wall of the flow line by an air passage.

While the inlet valves known in the art, such as the solenoid valve apparatus of DE 20 2018 100 215 U1 can generally be considered satisfactory in view of the technical requirements discussed above. However, there remains the need for improved inlet valves. Moreover, there remains the need for inlet valves which improve the economics of producing household appliances.

SUMMARY OF THE INVENTION

In a first aspect, the present invention addresses the above discussed needs by providing a flowmeter for determining a fluid flow rate through an associated valve assembly as defined in claim 1. The flowmeter comprises a housing, a sensor arrangement disposed in the housing, and a coupling portion provided at the housing. The sensor arrangement comprises at least one sensor configured to detect a quantity indicative of the fluid flow rate through the valve assembly. The coupling portion is configured to engage with an associated counter-coupling portion of the valve assembly for coupling the flowmeter to the valve assembly in an orientation with respect to the valve assembly selectable from a group comprising at least a first orientation and a second orientation.

In a second aspect, the present invention addresses the above discussed needs by providing a valve assembly as defined in claim 11 which comprises a valve body, at least one valve, a flow rate indicator and a counter-coupling portion. The valve body comprises at least one inlet duct, at least one outlet duct and a fluid path connecting the at least one inlet duct and the at least one outlet duct. The at least one valve is configured to control a fluid flow rate through the fluid path. The flow rate indicator is configured to provide a quantity indicative of the fluid flow rate through the fluid path, the quantity being detectable by a sensor of an associated flowmeter. The counter-coupling portion is configured to couple with an associated coupling portion of the flowmeter of the first aspect for coupling the flowmeter to the valve assembly in an orientation with respect to the valve assembly selectable from a group comprising at least a first orientation and a second orientation.

In a third aspect, the present invention addresses the above discussed needs by providing an inlet valve for a household appliance, such as a washing machine, which is defined in claim 14 and which comprises the valve assembly of the second aspect and the flowmeter of the first aspect.

In a fourth aspect, the present invention addresses the above discussed needs by providing a household appliance, such as a washing machine, which is defined in claim 15 and which comprises a valve assembly of the second aspect.

The present invention enables to attach a flowmeter to a valve assembly in different orientations, such as in an orientation freely selectable from a group comprising at least a first orientation and a second orientation. Thereby, the present invention is able to meet the space constraints of different household appliances, like washing machines by coupling the flowmeter of the first aspect to the valve assembly of the second aspect in a suitable one of the selectable orientations. The flowmeter of the first aspect, the valve assembly of the second aspect and the inlet valve of the third aspect are therefore readily employable in different types of washing machines, without the need for substantial modifications, if any.

It has to be understood that the present invention is not limited to a group of orientations comprising a first orientation and a second orientation in which the flowmeter is selectively attachable to the valve assembly. As will be clear from the following description, the flowmeter according to the first aspect, the valve assembly according to the second aspect, the inlet valve according to the third aspect and the household appliance according to the fourth aspect can optionally allow to selectively attach the flowmeter to the valve assembly in more than two orientations, for example in at least three orientations, at least four orientations, at least five or orientations or at least six orientations or more.

In a preferred embodiment, in all aspects of the present invention, the coupling portion is configured to removably couple with the associated counter-coupling portion of the valve assembly. Thus, the choice of orientation is reversible, i.e. the flowmeter may be removed from the valve assembly and re-coupled to the valve assembly in a different orientation.

Alternatively or additionally, in all aspects of the present invention, the at least one sensor is arranged in an encapsulated section of the housing. Thereby, the sensor may advantageously be protected against coming into contact with moisture and/or water.

Alternatively or additionally, in all aspects of the present invention, the housing comprises a mating surface and the coupling portion is configured such that, when the flowmeter is coupled to the valve assembly in an orientation selectable from the group comprising at least the first and second orientation, the mating surface engages an abutting surface of the valve assembly. Preferably, the valve assembly comprises at least one abutting surface. The engagement between the mating surface and the abutting surface may contribute to maintaining the predetermined distance under different loading conditions. Preferably, the sensor of the sensor arrangement is disposed in the housing beneath the mating surface. Alternatively or additionally, the valve assembly comprises a plurality of abutting surfaces and the mating surface engages a selected one of the plurality of abutting surfaces depending on the selected orientation of the group of orientations. In other embodiments, the valve assembly comprises a single abutting surface and the mating surface engages the single abutting surface in each orientation of the group of orientations.

Alternatively or additionally, in all aspects of the present invention, the coupling portion is configured such that, when the flowmeter is coupled to the valve assembly in an orientation selectable from the group comprising at least the first and second orientation, the coupling portion biases the mating surface against a respective one of the at least one abutting surface. The bias may reduce the risk that the mating surface separates from the abutting surface due to external loads, such as vibrational acceleration. Thereby, the reliability of the flow rate measurement may be increased, since the predetermined distance is maintained with increased probability. In particular, the formation of a gap between the mating surface and the abutting surface may be prevented.

Alternatively or additionally, in all aspects of the present invention, the coupling portion comprises a receiving portion configured such that, when the flowmeter is coupled to the valve assembly in an orientation selectable from the group comprising at least the first and second orientation, the counter-coupling portion of the valve assembly is least partially recessed in the receiving portion. The total dimensions of the inlet valve may thereby advantageously be reduced.

Alternatively or additionally, in all aspects of the present invention, the coupling portion comprises a plurality of coupling elements, wherein each coupling element is configured to engage with a respective counter-coupling element of a plurality of counter-coupling elements of the counter-coupling portion. Preferably, each coupling element is configured to selectively engage with each one of the counter-coupling elements. More preferably, each coupling element is configured to engage a selected one of the counter-coupling elements depending on a selected orientation from the group of orientations. Preferably, the coupling portion comprises at least a first coupling element and a second coupling element, wherein each of the at least first and second coupling elements is configured to engage a selected one of at least a first counter-coupling element and a second counter-coupling element of the counter-coupling portion of the valve assembly so as to selectively secure the flowmeter in an orientation chosen from the group comprising at least the first and second orientation. Preferably, the first coupling element is configured to engage the first counter-coupling element in the first orientation and to engage the second counter-coupling element in the second orientation. Alternatively and or additionally, the second coupling element is configured to engage the second counter-coupling element in the first orientation, and to engage the first counter-coupling element in the second orientation.

Alternatively or additionally, in all aspects of the present invention, the coupling portion comprises a first leg and a second leg, the first and second leg being spaced apart to define the receiving portion therebetween.

Alternatively or additionally, in all aspects of the present invention, the counter-coupling portion comprises a plurality of counter-coupling elements, wherein each counter-coupling element is configured to engage with a respective coupling element of the plurality of coupling elements of the coupling portion. Preferably, each counter-coupling element is configured to selectively engage with each one of the coupling elements. More preferably, each counter-coupling element is configured to engage a selected one of the coupling elements depending on a selected orientation from the group of orientations. Preferably, the counter-coupling portion comprises at least a first counter-coupling element and a second counter-coupling element, wherein each of the at least first and second counter-coupling elements is configured to engage a selected one of at least a first coupling element and a second coupling element of the counter-coupling portion of the valve assembly so as to selectively secure the flowmeter in an orientation chosen from the group comprising at least the first and second orientation. Preferably, the first counter-coupling element is configured to engage the first coupling element in the first orientation and to engage the second coupling element in the second orientation. Alternatively and or additionally, the second counter-coupling element is configured to engage the second coupling element in the first orientation, and to engage the first coupling element in the second orientation.

Alternatively or additionally, in all aspects of the present invention, the first coupling portion is provided at the first arm and the second coupling portion is provided at the second arm.

Alternatively or additionally, in all aspects of the present invention, the counter-coupling portion is provided at an annular outer surface of a wall section of the valve body which encloses the fluid path. Preferably, the annular outer surface is arranged concentrically with the flow axis defined by the fluid path. Alternatively or additionally, the counter-coupling elements are provided at the annular outer surface of the wall section of the valve body. Preferably, the counter-coupling elements are spaced around the annular outer surface at regular intervals. More preferably, an angle formed between two adjacent counter-coupling elements equals to 360° divided by the total number of counter-coupling elements. For example, when the counter-coupling portion comprises two counter-coupling elements, it is preferred that the two counter-coupling elements are spaced around the annular outer surface at a 180° separation.

Alternatively or additionally, in all aspects of the present invention, the coupling portion and/or the counter-coupling portion is configured such that, when the flowmeter is coupled to the valve assembly in an orientation selectable from the group comprising at least the first and second orientation, the at least one sensor is in a detection position. The detection position is a position suitable for the sensor to detect the quantity indicative of the fluid flow rate.

Alternatively or additionally, in all aspects of the present invention, the coupling portion and/or the counter-coupling portion is configured such that, when the flowmeter is coupled to the valve assembly in an orientation selected from the group comprising at least the first and second orientation, the at least one sensor is positioned at a predetermined distance from the flow rate indicator. In particularly preferred embodiments, the predetermined distance is substantially equal in each one of orientations comprised in the group of orientations. Thereby, the prerequisites for a reliable detection of the flow rate may be maintained in each one of the orientations comprised in the group of orientations.

Alternatively or additionally, in all aspects of the present invention, the coupling portion and/or the sensor arrangement is integrally formed with the housing. Preferably, the coupling portion is molded with the housing in a molding step. Preferably, the sensor is molded onto the sensor arrangement. More preferably, the encapsulated section of the housing is formed by molding the housing onto the sensor arrangement. This simplified production of the flow meter considerably.

Alternatively or additionally, in all aspects of the present invention, the counter-coupling portion is integrally formed with the valve body. Preferably, the counter-coupling portion is molded with the valve body in a molding step.

Alternatively or additionally, in all aspects of the present invention, the flow rate indicator comprises an impeller, which is provided in a portion of the fluid path. Preferably, the impeller is arranged such that its plane of rotation is perpendicular to a flow axis defined by the portion of the fluid path. The impeller is configured to be rotated by the fluid flow in the fluid path. The rate of rotation of the impeller is therefore indicative of the fluid flow rate of the flow in the fluid path. More preferably, an axis of rotation of the impeller coincides with the flow axis.

Alternatively or additionally, in all aspects of the present invention, the detectable quantity is a magnetic field. Preferably, the magnetic field is provided by at least one magnetic portion of the flow rate indicator of the valve assembly. In further preferred embodiments, the magnetic portion comprises a material chosen from a group comprising ferrite and rare earth metals, such as neodymium. Rare earth metals, such as neodymium may be preferred for its magnetic properties. Ferrite may be preferred for its price.

Alternatively or additionally, in all aspects of the present invention, the predetermined distance is adapted to the magnetic portion. In preferred embodiments, the predetermined distance is adapted to a material comprised in the magnetic portion. In particularly preferred embodiments, the predetermined distance is adapted to the magnetic portion comprising ferrite. Alternatively or additionally, the predetermined distance is adapted to the magnetic portion comprising a rare earth metal, such as neodymium. In particularly preferred embodiments, the predetermined distance is a mean value between a predetermined distance adapted to a magnetic portion comprising ferrite and a predetermined distance adapted to a magnetic portion comprising a rare earth metal, such as neodymium. Thus, the present invention may be used with rare earth metal magnets, such as neodymium magnets, as well as ferrite magnets without having to change the dimensions of either flowmeter or valve assembly.

Alternatively or additionally, in all aspects of the present invention, the impeller comprises the magnetic portion. The magnetic portion has a distance from the rotational axis of the impeller. Thereby, the variation of the magnetic field provided by the magnetic portion when rotating with the impeller is indicative of the fluid flow rate of the flow in the fluid path. Alternatively or additionally, the flow rate indicator comprises a plurality of magnetic portions arranged on a circle around the flow axis defined by the fluid path at alternating polarity. Preferably, the plurality of magnetic portions is arranged on the impeller and radially aligned with the axis of rotation at alternating polarity. In other words adjacent magnetic portions have poles of opposing polarity oriented radially outward. Alternating polarity provides a detectable polarity change as a further indicator for the flow rate and/or as a measure to perform a consistency check of the detected magnetic field.

Alternatively or additionally, in all aspects of the present invention, the sensor of the sensor arrangement of the flowmeter is a hall sensor. A hall sensor may allow the flowmeter to detect the quantity indicative of the flow rate in the fluid path while being physically separated from the fluid path. In particular, the hall sensor allows to detect a magnetic field provided by the flow rate indicator. It has to be understood however, that any other sensor and indicator combination known in the art and capable of measuring a rotation rate of impeller may be used instead, such as capacitive sensors wherein the detectable quantity is an electric field.

Alternatively or additionally, in all aspects of the present invention, each of the orientations comprised in the group of orientations is located in a common plane. In further preferred embodiments, the common plane is arranged perpendicular to a flow axis defined by the fluid path. In further or additional preferred embodiments, the common plane corresponds to a plane of rotation of the impeller of the flow rate indicator. In further or additional preferred embodiments, the detection position lies in the common plane. Alternatively or additionally, the predetermined distance is a distance in the common plane.

Alternatively or additionally, in all aspects of the present invention, the orientations comprised in the group of orientations are disposed on a circle concentric with a flow axis defined by the fluid path. Preferably, the orientations comprised in the group of orientations are defined by an orientation of a major axis of the flowmeter, such as an axis of symmetry of the flowmeter, in a plane perpendicular to the flow axis. More preferably, the circle on which the orientations are disposed is arranged in the plane perpendicular to the flow axis. It is alternatively or additionally preferred that the orientations comprised in the group of orientations are defined by vectors extending radially outward from the flow axis. Preferably, the orientations are disposed at regular intervals along a circumference of the circle. Alternatively or additionally, an angle formed between two adjacent orientations, i.e. two orientations neighboring each other in a circumferential direction of the circle, equals to 360° divided by the number of orientations comprised in the group of orientations.

Alternatively or additionally, an angle formed between adjacent orientations is 180°, 120°, 90°, 72°, 60° or 45°.

Alternatively or additionally, in all aspects of the present invention, each orientation comprised in the group of orientations is aligned with a radial direction extending from the flow axis formed by the fluid path.

It has to be understood the present invention is not limited to usage in household appliances. As will be clear from the following description, the present invention is readily adaptable to any application requiring determination and/or control of a flow rate of a fluid. In some embodiments of the first, second, third or aspect of the present invention, the flowmeter is configured to determine and/or control a flow rate of a liquid. In preferred embodiments, the liquid is water. In other preferred embodiments, the liquid is a substance other than water, such as oil. Alternatively or additionally, the first, second, third or fourth aspect of the present invention is configured to determine and/or control a fluid flow rate of a gas.

Alternatively or additionally, in all aspects of the present invention, the valve assembly has at least one inlet duct (e.g. one, two, three, or four inlet ducts) and a number of outlet ducts greater than two, for example three or more outlet ducts, four or more outlet ducts or five or more outlet ducts. Alternatively or additionally, the valve assembly has at least one outlet duct (e.g. one, two, three or four outlet ducts) and a number of inlet ducts greater than one, for example two or more outlet ducts, three or more outlet ducts or four or more outlet ducts.

Further advantages and preferred embodiments of the present invention will be described in the following together with the drawings listed below.

DETAILED DESCRIPTION

A preferred embodiment of an inlet valve V is depicted in FIGS. 1 to 8 and comprises a valve assembly 10 and a flowmeter 100 removably attached to the valve assembly 10. As stated above, the present invention enables to attach flowmeter 100 to valve assembly 10 in an orientation selectable from a group of different orientations, such as in a selectable one of a first orientation (as depicted for example in FIGS. 1 and 3) and a second orientation (as depicted for example in FIG. 2).

In preferred embodiments of the present invention, inlet valve V is configured for use in a household appliance. In the particularly preferred embodiment of FIGS. 1 to 8, inlet valve V is configured for use in a washing machine. In other preferred embodiments, inlet valve V can be configured for use in a dishwasher. When used in a washing machine or in a dishwasher, inlet valve V is configured to release detergent from one or more detergent storages of the washing machine or dishwasher. For this purpose, inlet valve V is configured to control water flow from an external water supply to the one or more detergent containers, from which the detergent is flushed to an application site.

In the particularly preferred embodiment depicted in FIGS. 1 through 8, valve assembly 10 comprises a valve body 12 forming an inlet duct 16, a first outlet duct 18 and a second outlet duct 20. Inlet duct 16 is configured to be connected to an external water supply line, such as a water tap. An inflow stream IF is provided by the external water supply and enters valve assembly 10 through inlet duct 16. First outlet duct 18 and second outlet duct 20 are configured to be connected to internal water distribution lines (not depicted) of the washing machine. First outlet duct 18 is connectable to a first detergent storage via a first internal water distribution line. Likewise, second outlet 20 duct is connectable to a second detergent storage via a second internal water distribution line. As indicated by solid black lines in FIG. 2, a flow path 14 is formed in valve body 12. Flow path 14 extends from inlet duct 16 to the first outlet duct 18 and the second outlet duct 20, and enables inflow stream IF entering at inlet duct 16 to pass through valve assembly 10 and exit as first outflow stream OF1 via first outlet duct 18 and as second outflow stream OF2 via second outlet duct 20. At a junction 15, flow path 14 branches off into a first branch 14a, leading to first outlet duct 18, and a second branch 14b leading to second outlet duct 20.

In the depicted embodiment, inlet duct 16, first outlet duct 18 and second outlet duct 20 are each formed from a respective cylindrical protrusion 17, 19, 21 of valve body 12. Cylindrical protrusion 17 forming inlet duct 16 has a threaded outer surface connectable to a corresponding threaded portion of the external water supply line. Likewise, cylindrical protrusion 19 forming first outlet duct 18 and cylindrical protrusion 21 forming second outlet duct 20 each have a threaded outer surface connectable to a corresponding threaded portion of a respective internal water distribution line. It has to be understood that any other flow-bearing coupling known in the art can be used instead of a threaded connection, such as interference fit couplings or press fit couplings.

To control outflow stream OF1 and outflow stream OF2, valve assembly 10 comprises a first valve (not depicted) and a second valve (not depicted). A first valve seat 38 is formed in valve body 12 and configured to receive the first valve. First valve seat 38 is positioned downstream of junction 15, and above first branch 14a of flow path 14. First valve seat 38 is configured such that a control element of the first valve can extend into first branch 14a to adjust an available flow cross-section of first branch 14a. Likewise, second valve seat 39 is positioned downstream of junction 15, and above second branch 14b of flow path 14. Second valve seat 39 is configured such that a control element of the second valve can extend into second branch 14b to adjust an available flow cross-section of second branch 14b. By controlling the available flow cross-sections of first branch 14a and second branch 14b, valve assembly 10 controls the flow rate of first outflow stream OF1 and the flow rate of second outflow stream OF2 depending on the flow rate of inflow stream IF. The first and second valve are configured to receive input signals of an electronic control unit of the washing machine and adjust the respective flow cross-sections accordingly. Any valve type known in the art, controllable by an electronic control unit and capable of adjusting an available cross-section of a flow path, is suitable for use in all aspects of the present invention. In preferred embodiments, the first and second valve are electromechanically operated valves, in particular solenoid valves. In the particularly preferred embodiment of FIGS. 1 to 8, the washing machine is configured to adjust a flow rate of first outflow stream OF1 according to an amount and/or type of detergent present in the first detergent storage. Likewise, the washing machine is configured to adjust a flow rate of second outflow stream OF2 according to an amount and/or type of detergent present in the second detergent storage. In particularly preferred embodiments, the washing machine is configured such that a simultaneous supply of first and second outflow stream OF1 and OF2 flushes a third detergent storage.

It has to be understood that the present invention is not limited to the number of inlet ducts and outlet ducts of the preferred embodiment of FIGS. 1 to 8. It generally suffices that the valve assembly has at least one inlet duct and at least one outlet duct, and the particular number of inlet ducts and outlet ducts can be adapted as needed.

As will be explained in greater detail in the following sections, valve assembly 10 further comprises a counter-coupling portion 28 which is configured to engage with a coupling portion 104 of flowmeter 100 to selectively and removably attach flowmeter 100 in either one of the first orientation and second orientation. Valve assembly 10 further comprises at least one flow rate indicator 22 which is configured to provide a quantity indicative of the fluid flow rate through fluid path 14, the quantity being detectable by a sensor 108 of flowmeter 100.

Figure 4:
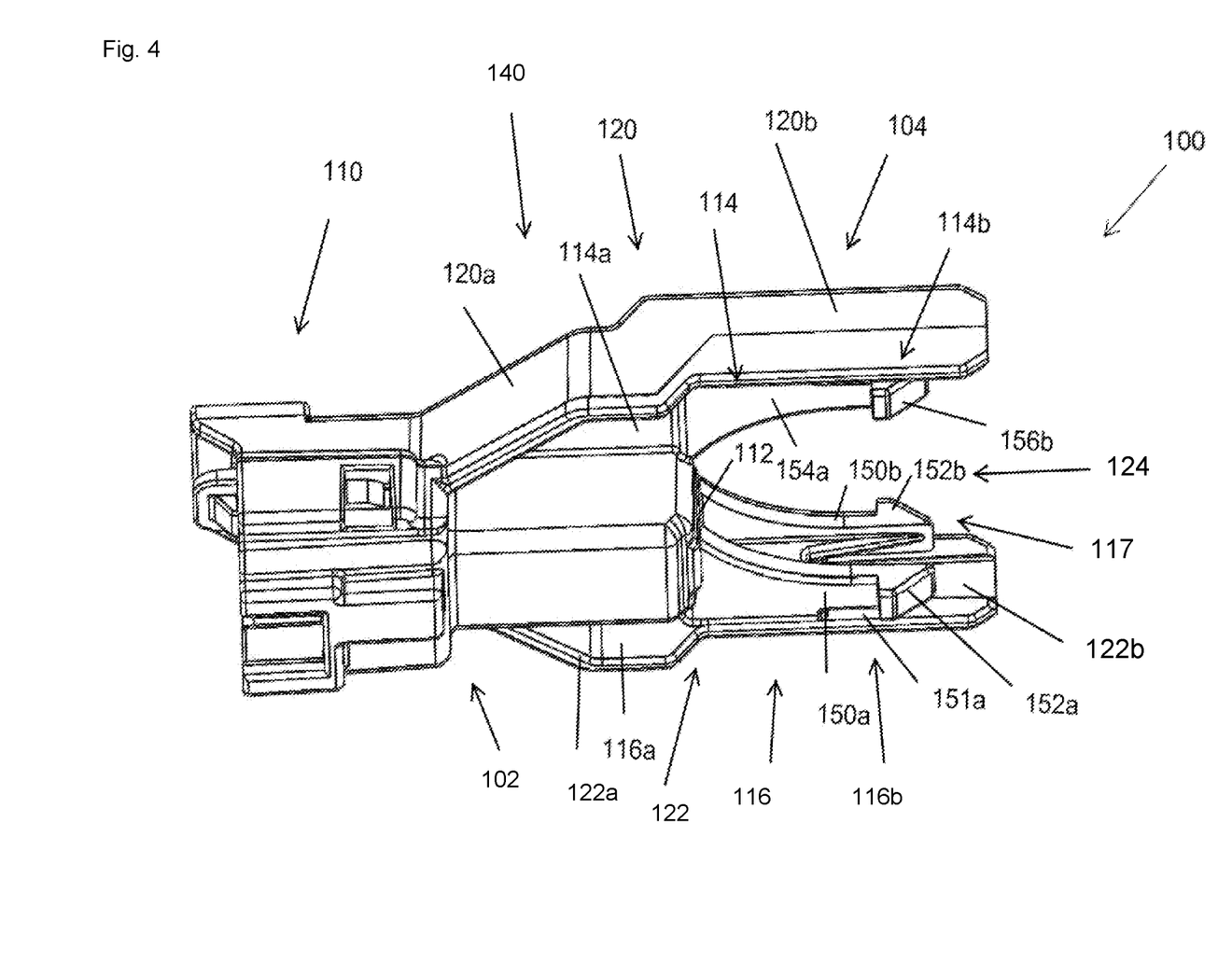
FIG. 4 shows an embodiment of a flowmeter according to the present invention.

As shown in FIG. 4, flowmeter 100 is provided as an entity separate from and removably attachable to valve assembly 10. Flowmeter 100 is configured to determine the fluid flow rate of inflow flow stream IF at inlet duct 16, thereby enabling the electronic control unit of the washing machine to control the first and second valve of valve assembly 10 as required. Flowmeter 100 comprises a housing 102, which houses a sensor arrangement 106 comprising at least one sensor 108. As will be explained in greater detail below, flowmeter 100 comprises a coupling portion 104 configured to selectively and removably attach flowmeter 100 to valve assembly 10 in either one of the first and second orientation.

Figure 5:
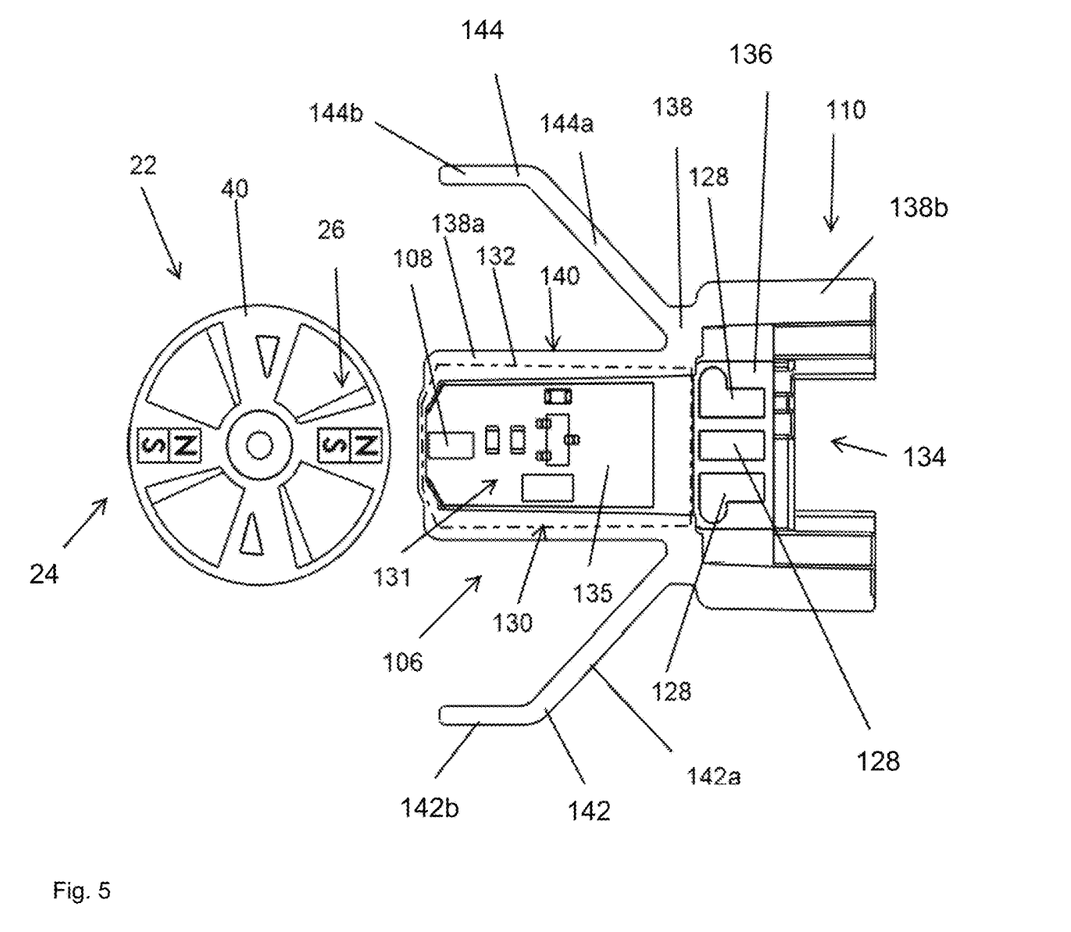
FIG. 5 depicts a position of a sensor arrangement of the flowmeter of FIG. 1 or FIG. 4 relative to a flow rate indicator of a valve assembly of the inlet valve of FIG. 1.
Figure 6:
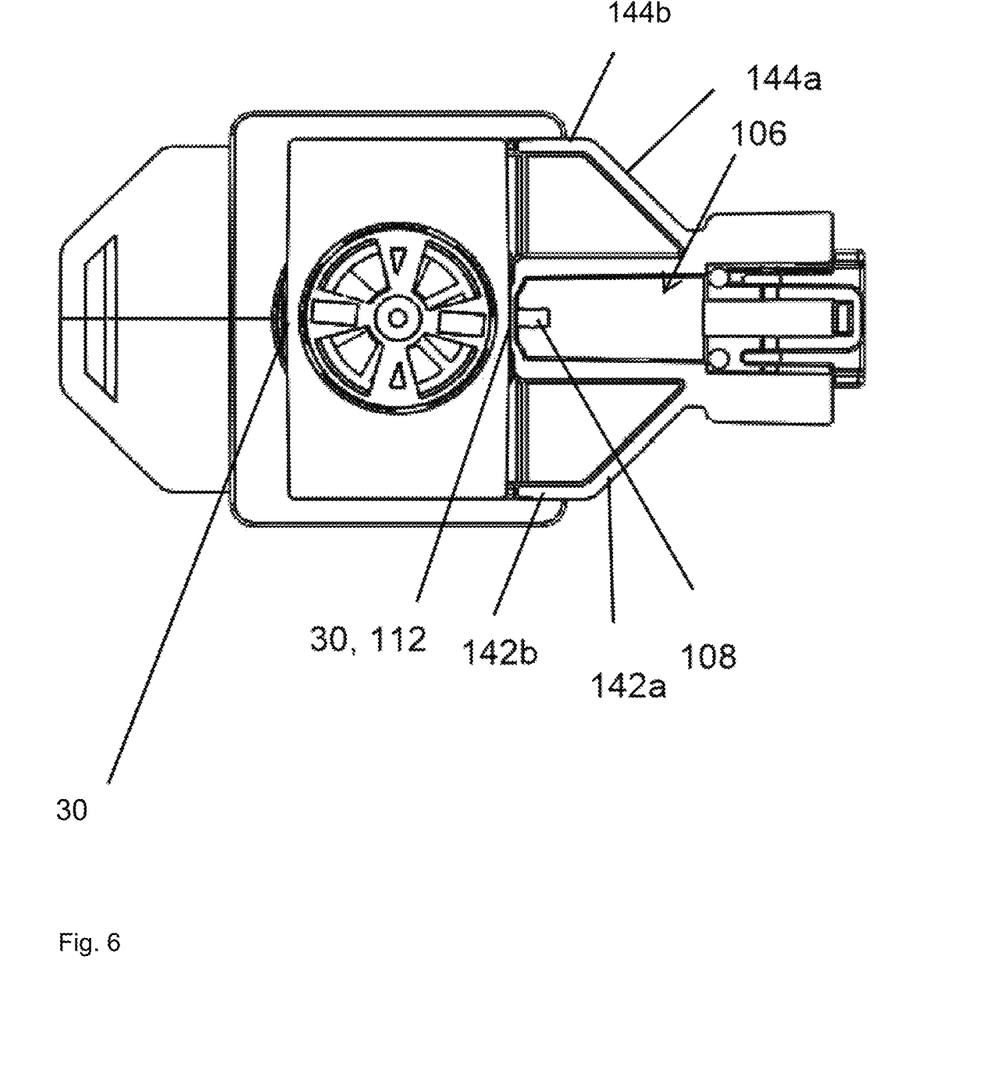
FIG. 6 is a frontal view of the inlet valve of FIG. 1 with sections of the flowmeter and the valve assembly removed.
Figure 7:
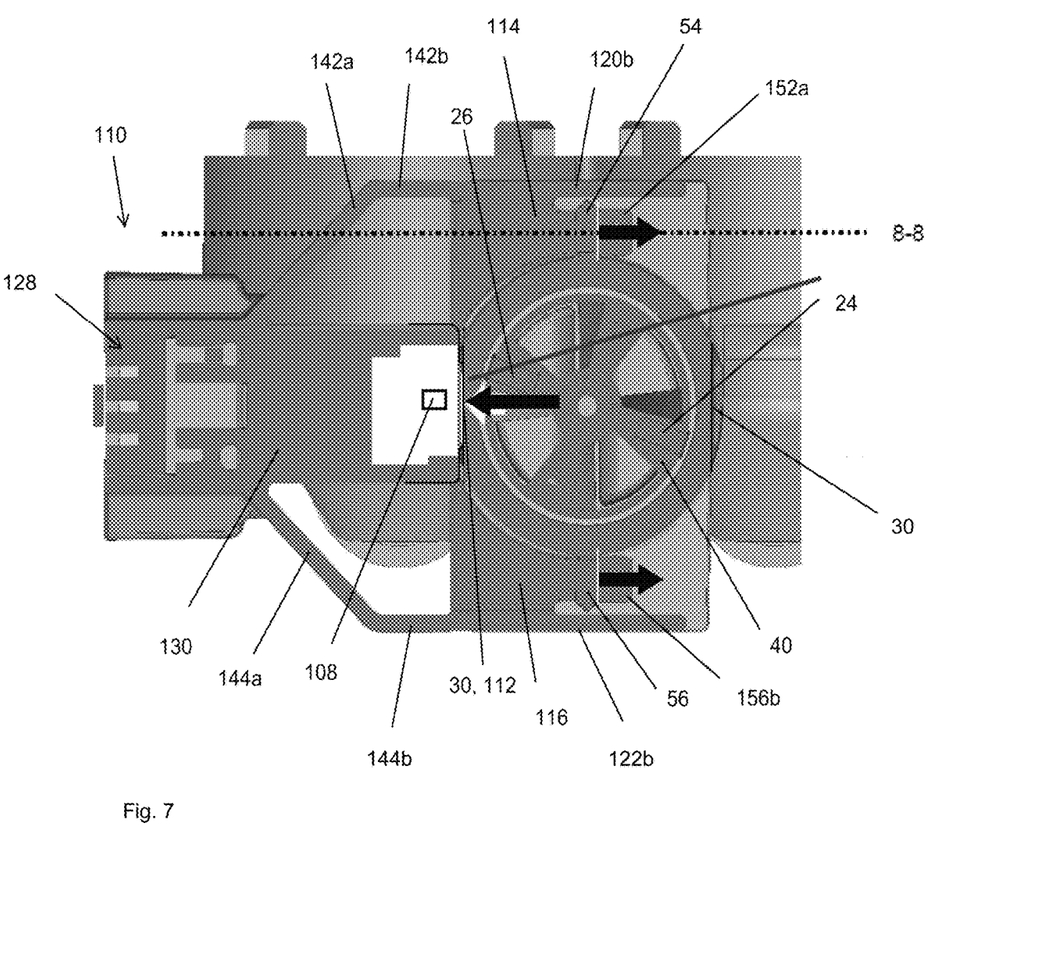
FIG. 7 provides a cross sectional view of the inlet valve in a plane indicated by the dashed line shown in FIG. 2.
Figure 8:
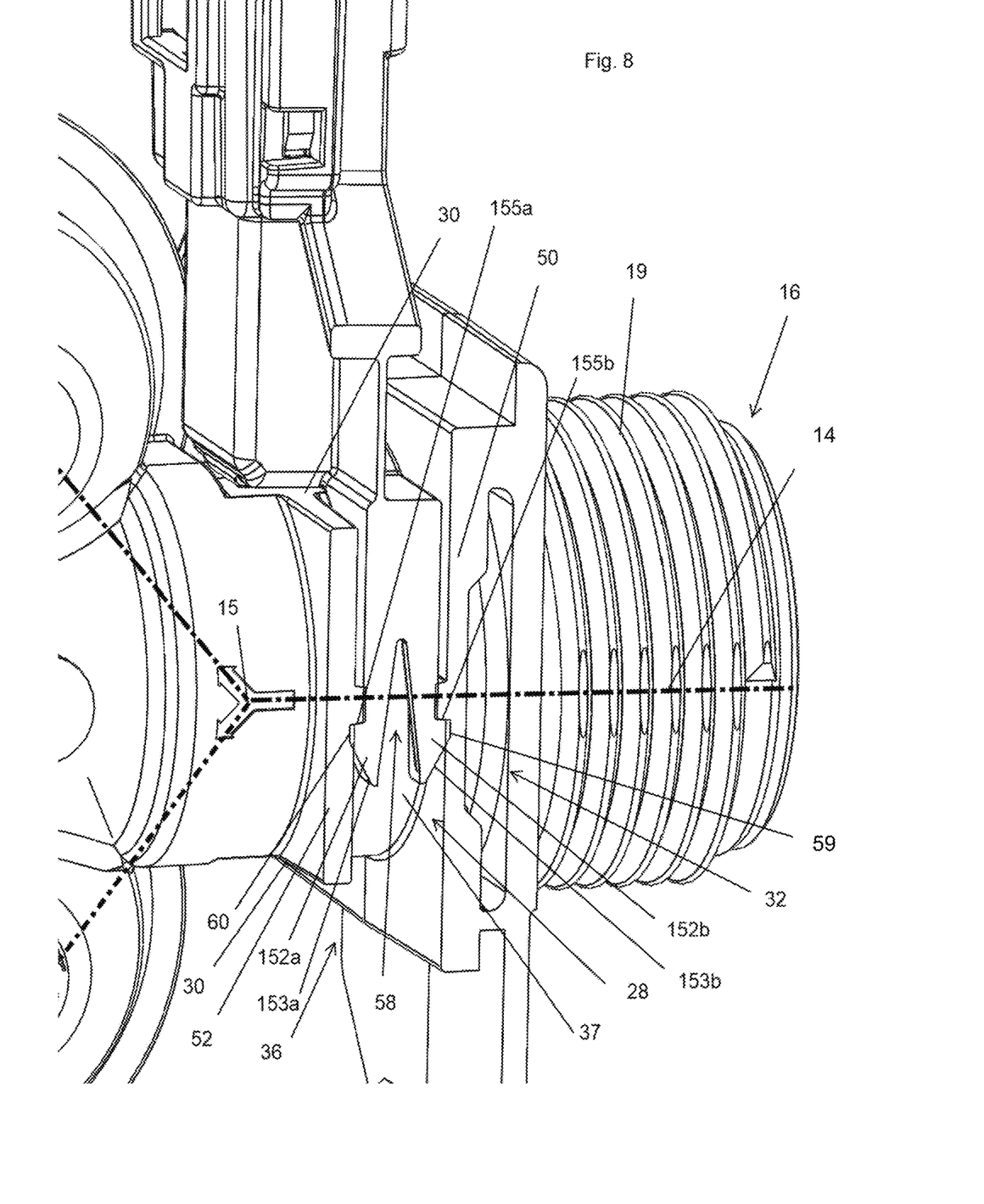
FIG. 8 is a detailed a cross sectional view of the embodiment the inlet valve in a plane indicated by the dashed line shown in FIG. 7.

The cross-sectional views of FIGS. 5, 7 and 8 expose sensor arrangement 106, which is shielded from view by housing 102 in FIG. 4. In the preferred embodiment of FIGS. 1 to 8, sensor arrangement 106 further comprises a circuit board 130 carrying circuitry 131 for processing signals received from sensor 108. Circuit board 130 further comprises a plurality of contact terminals 128 disposed on a portion of circuit board 130 that forms a contact section 136. Sensor 108 and circuitry 131 are disposed on a portion of circuit board 130 that forms a circuit section 135, with sensor 108 being positioned at an end of circuit section 135 that lies opposite from an end of circuit section 135 that is adjacent to contact section 136. Housing 102 comprises an encapsulated section 132 (indicated by dashed lines in FIG. 5) partially covering circuit board 130, such that circuitry 131 and sensor 108 lie within encapsulated section 132, and contact terminals 128 lie outside of encapsulated section 132. In other words, contact section 136 corresponds to a portion of contact board 130 which is positioned outside of encapsulated section 132. As will be described in the following sections, encapsulated section 132 forms a water resistant barrier around circuit board 130. Housing 102 further comprises a planar mating surface 112 on an outer surface thereof. As can be seen for example in FIGS. 6 and 7, sensor 108 is positioned within housing 102 below mating surface 112.

Contact terminals 128 are configured to be contactable by respective corresponding contact terminals of a data cable (not depicted) which is connected to the electronic control unit of the washing machine. In other words, flowmeter 100 comprises a data link, configured to provide the signals received from sensor 108 to the control unit of the washing machine. In the embodiment of FIGS. 1 to 8, housing 102 of flowmeter 100 comprises a connection section 110 forming a socket 134 in which contact terminals 128 are positioned. Socket 134 is configured to receive a corresponding plug of the data cable. It has to be understood that flowmeter 100 can comprise alternative data links. In some preferred embodiments, the data link is provided by a wireless connection, thereby eliminating the need for connection section 110, socket 134 and contact terminals 128. In other preferred embodiments, a wireless datalink is combined with a connection section configured to be connected with a power supply line. In the embodiment of FIGS. 1 to 8, power is supplied to flowmeter 100 at contact terminals 128.

In FIG. 5, sensor arrangement 106 of flowmeter 100 is removed from housing 102 and exposed for view. Sensor arrangement 106 comprises circuit board 130 and a support structure 138. Circuit board 130 is disposed on a top surface of a main portion of support structure 138, thus leaving a top surface of contact board 130 (on which circuitry 131, sensor 108 and contact terminals 128 are placed) uncovered. The main portion of support structure 138 comprises a circuitry portion 138*a* on which circuit section 135 of circuit board 130 is arranged, and a terminal portion 138*b* on which contact section 136 of circuit board 130 is arranged. As shown in FIG. 5, support structure 138 is substantially symmetrical in shape with a respective axis of symmetry extending from circuitry portion 138*a* to terminal portion 138*b*. A first leg 142 and a second leg 144 extend from opposite sides of the main portion of support structure 138. Each of first and second legs 142, 144 comprise a base portion 142*a*, 144*a*, which is angled to the axis of symmetry of support structure 138, and an extension portion 142*b*, 144*b*, which is substantially parallel to the axis of symmetry of support structure 138. Base portions 142*a*, 142*b* connect respective leg 142, 144 to the main portion of support structure 138 at a boundary region between circuitry portion 138*a* and terminal portion 138*b*. Base portions 142*a*, 144*a* then extend outward from the main portion and in a direction away from terminal portion 138*b*. Extension portions 142*b*, 144*b* extend at an angle from respective ends of base portions 142*a*, 144*a* in a direction away from terminal portion 138*b*. Extension portions 142*b*, 144*b* are substantially parallel to one another. Support structure 138 is substantially flat, i.e. its thickness is substantially smaller compared to its width and length. In some embodiments, the top surface of support structure 138 is even. In some embodiments, the top surface of support structure 138 is structured. In particularly preferred embodiments, a portion of the top surface of support structure 138 which forms part of socket 134 is recessed compared to the remaining portions of the top surface.

In preferred embodiments, producing flowmeter 100 comprises a multi-step molding process. Molding processes are particularly preferred for their potential to economize production of flowmeter 100. In a first molding step, support structure 138 is molded. Circuit board 130 may be attached to support structure 138 in a separate step after the first molding step. In preferred embodiments, support structure 138 is molded onto circuit board 130, thus eliminating the need for a separate attachment step. In a second molding step, housing 102 is molded onto sensor arrangement 106. Encapsulated section 132 of housing 102 is formed by a portion of molded material which covers the remaining exposed portions of circuit board 130 with the exception of contact section 136. In the embodiment of FIGS. 1 to 8, the remaining exposed portion of circuit board 130 is its top surface, which is oriented towards the viewer in FIG. 5. Forming encapsulated section 132 in this manner is particularly preferred for its potential to reduce the effort necessary for sealing circuitry 131 against water ingress compared to conventional methods.

In the particularly preferred embodiment of FIGS. 1 to 8, coupling portion 104 is integrally formed with housing 102 in the second molding step. When integrally formed, housing 102 and coupling portion 104 form a monolithic flowmeter housing 140. In alternative embodiments, housing 102 and coupling portion 104 are formed separately and connected in a subsequent step to form flowmeter 100.

When formed in the above-described multi-step molding process, housing 102, coupling portion 104 and support structure 138 each comprise a molded material, preferably a thermoplastic, thermosetting or elastomeric polymer or any suitable combination thereof. In some embodiments, the same molded material is used for housing 102, coupling portion 104 and support structure 138. In other embodiments, housing 102, coupling portion 104 and support structure 138 are formed from different molded materials.

Coupling portion 104, as best depicted in FIG. 4, comprises a first leg 120 and a second leg 122 extending in a direction away from housing 102. Each of first and second legs 120 and 122 comprise a respective base 120a, 122a and a respective extension portion 120b, 122b. Base 120a connects first leg 120 to connection section 110 of housing 102. Likewise, base 122a connects second leg 122 to connection section 110 of housing 102. Each of base 120a, 122a extend from opposite sides of housing 102 at an angle in a direction away from connection section 110. Extension portions 120b, 122b extend at an angle from their respective base 120a, 122a in parallel to one another and in a direction away from connection section 110. Thus, legs 120, 122 of attachment structure 104 are similar in shape to legs 142, 144 of support structure 138. When formed in the above described two-step molding process, legs 120, 122 are formed from molded material which encloses legs 142, 144. A space separating first and second legs 120 and 122 defines a receiving portion 124 for receiving at least a portion of counter-coupling portion 28 of valve assembly 10 therein. As shown for example in FIG. 7, extension portions 120b, 122b of attachment structure 104 are longer than extension portions 142b, 144b of support structure 138, i.e. they extend further in a direction away housing 102. Receiving portion 124 is located in the space provided by the additional length of extension portions 120b, 122b. When flowmeter 100 is attached to counter-coupling portion 28 of valve assembly 10, a portion of valve assembly 10 forming counter-coupling portion 28 is partially recessed in receiving portion 124, reducing the overall dimensions of inlet valve V.

Figure 2:
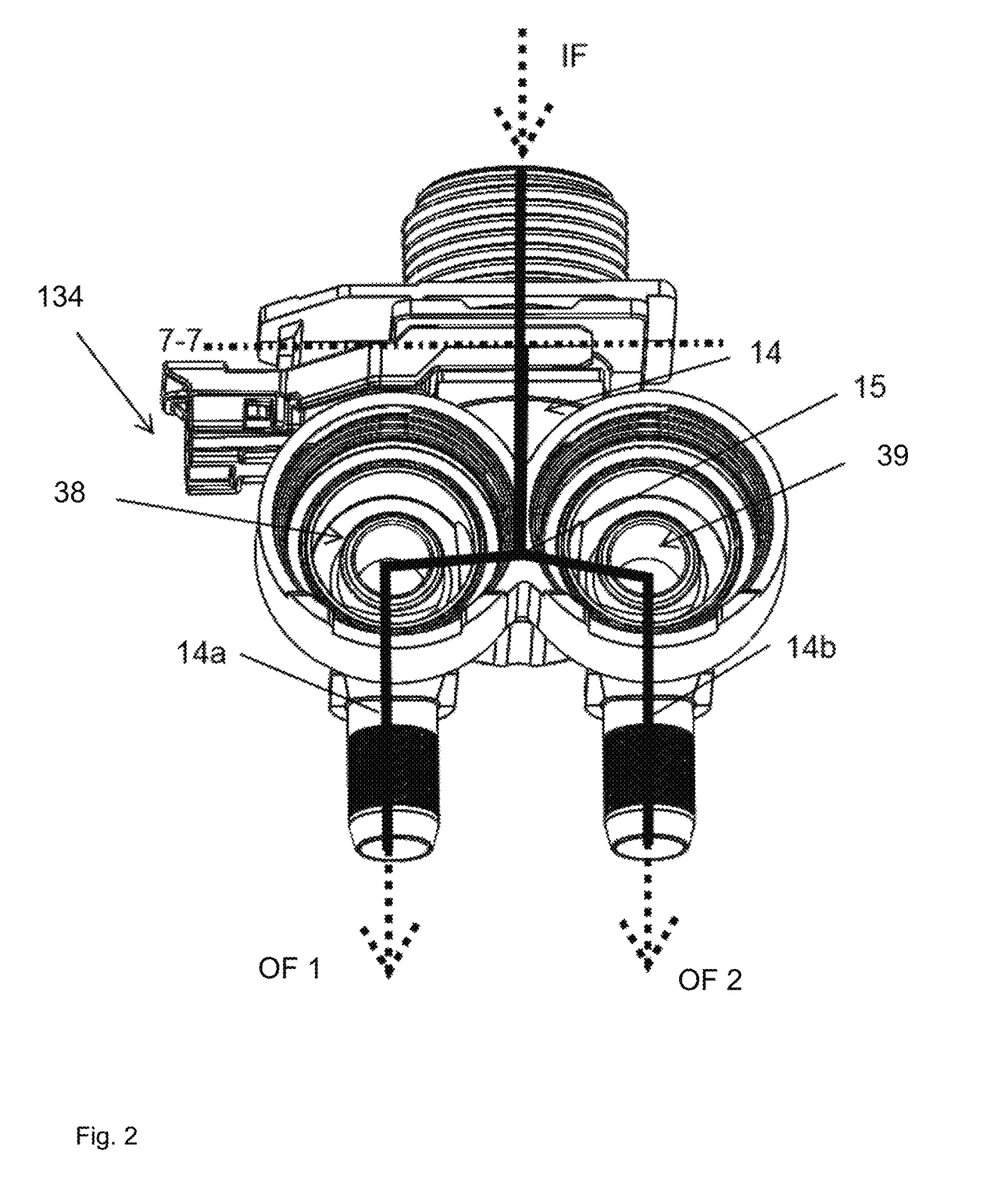
FIG. 2 is a top view of the inlet valve of FIG. 1 with a flowmeter arranged in a second orientation.

FIG. 7 is a view of inlet valve V cut in a plane indicated by dashed line 7-7 in FIG. 2. In FIG. 8, segments of inlet valve V are cut along dashed line 8-8 indicated in FIG. 7. As depicted in FIGS. 4, 7 and 8, coupling portion 104 also comprises a first coupling element 114 and a second coupling element 116. In the embodiment of FIGS. 1 to 8, first coupling element 114 is integrally formed with first leg 120 and extends from housing 102 in a direction away from connection section 110. Likewise, second coupling element 116 is integrally formed with second leg 122 and extends from housing 102 in a direction away from connection section 110. First and second coupling elements 114, 116 each comprise a respective connection portion 114a, 116a which connects coupling elements 114, 116 to housing 102. In the embodiments of FIGS. 1 to 8, connection portions 114a, 116a are formed from molded material that fills a space between housing 102 and respective legs 120, 122, resulting from respective base portions 120a, 122a extending away from housing 102. Coupling elements 114, 116 each further comprise a respective retaining portion 114b, 116b. In the depicted embodiment, each retaining portion 114b, 116b is forked into a pair of parallel prongs 150a, 150b, 154a, 154b. Each prong 150a, 150b, 154a, 154b, ends in a respective locking lug 152a, 152b, 156a, 156b. Locking lugs 152a, 152b, 156a, 156b are substantially arrow-shaped, with a tip portion defining a section of increased width of retaining portions 114b, 116b.

Counter-coupling portion 28 of valve assembly 10, best depicted in FIGS. 7 and 8, is provided at a wall section 36 of valve body 12 which encloses fluid path 14 (dashed line in FIG. 8) in a segment downstream of inlet duct 16 and upstream of junction 15. Wall section 36 comprises an annular outer surface 37 from which an upstream wall segment 50 and a downstream wall segment 52 extend radially outward. Counter-coupling portion 28 is defined between upstream wall segment 50 and downstream wall segment 52. A first bracket 54 and a second bracket 56 which extend radially outward from outer surface 37. First bracket 54 and second bracket 56 form counter-coupling elements of counter-coupling portion 28 and are arranged at a 180° separation from one another in a plane perpendicular to fluid path 14, i.e. in the plane of FIG. 7. As indicated by dashed line 8-8 in FIG. 7, the view of FIG. 8 cuts through first bracket 54 and visualizes how each of first and second brackets 54, 56 connect upstream wall segment 50 and downstream wall segment 52. Brackets 54, 56 each comprise an eyelet 58, which is formed by a respective opening extending through brackets 54, 56 in a direction substantially tangential to annular outer surface 37 at the respective location of brackets 54, 56. As depicted in FIG. 8, respective indents 59, 60 are formed in upstream wall segment 50 and downstream wall segment 52 immediately adjacent first bracket 54. Corresponding indents (not depicted) are formed immediately adjacent second bracket 56. Indents 59, 60 are optional and may provide further safety against unintended separation of flowmeter 100 from valve assembly 10. Wall section 36 further comprises a pair of abutting surfaces 30 arranged on opposite sides of valve body 12. Abutting surfaces 30 extend in parallel to fluid path 14 and perpendicular to a direction defined by axis extending through the eyelets of brackets 54, 56.

To attach flowmeter 100 to valve assembly 10, flowmeter 100 is positioned so that receiving portion 124 is oriented towards counter-coupling portion 28. Coupling portion 104 is positioned between upstream wall 50 and downstream wall 52. First coupling element 114 is aligned with eyelet 58 of first bracket 54 and second coupling element 116 is aligned with the eyelet of second bracket 56. Flowmeter 100 is then advanced so that first and second coupling elements 114, 116 are simultaneously threaded into the respective eyelets of first and second bracket 54, 56. Prongs 150a, 150b, 154a, 154b are generally shaped to follow the contour of annular outer surface 37 of counter-coupling portion 26. Thereby, advancing receiving portion 124 over counter-coupling portion 28 may be facilitated. The connection between coupling elements 114, 116 and brackets 54, 56 is now explained with reference to FIG. 8 and the depicted connection between first coupling element 114 and bracket 54. It has to be understood that the connection between second coupling element 116 and bracket 56 is established correspondingly. Eyelet 58 provides an opening that is narrower than the width of retaining portion 116b defined by opposing locking lugs 152a, 152b. As depicted in FIG. 4, locking lugs 152a, 152b are connected only to a respective prong 150a, 150b, while being separated from extension portion 122b by a respective slit 151a. Locking lugs 150a, 150b of retaining portion 116b are therefore configured to be elastically urged toward one another. As explained above, each of locking lugs 152a, 152b is generally arrow-shaped. For threading first pin 114 into eyelet 58 of bracket 54, chamfered front ends 153a, 153b of arrow-shaped locking lugs 152a, 152b are configured to elastically urge the pair of locking lugs 152a, 152b toward one another so that the tips of locking lugs 152a, 152b can pass through eyelet 58. Locking lugs 152a, 152b are configured to snap back in their undeformed configuration once the tip portions have passed through eyelet 58. The arrow-shaped locking lugs 152a, 152b are configured to engage the respective indents 59, 60. As discussed above, indents 59, 60 are optional and can provide further safety against unintended separation of flowmeter 100 and valve assembly 10. As depicted in FIG. 8, back ends 155a, 155b are configured to engage with bracket 54 as depicted in FIG. 8, and thereby prevent coupling element 114 from being unintentionally removed from eyelet 58. Back ends 155a, 155b are preferably chamfered at an angle configured to allow toolless removal of coupling element 114 from bracket 54, and thus of flowmeter 100 from valve assembly 10. By virtue of back ends 155a, 155b engaging with bracket 54, flowmeter 100 can potentially decreases the risk of unintended separation from valve assembly 10, even if inlet valve V is subject to intense vibrations.

Figure 1:
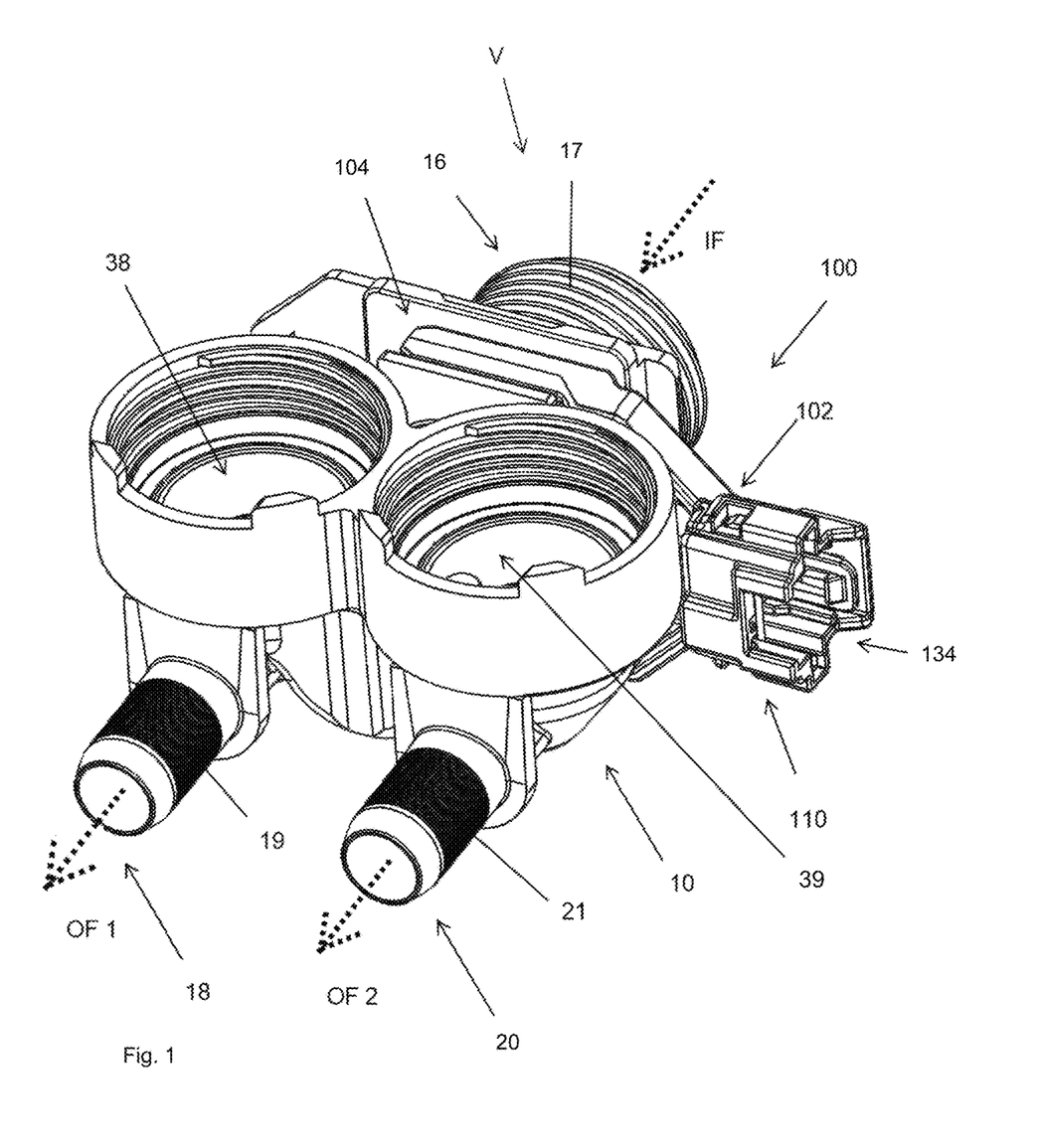
FIG. 1 shows an embodiment of an inlet valve according to the present invention.
Figure 3:
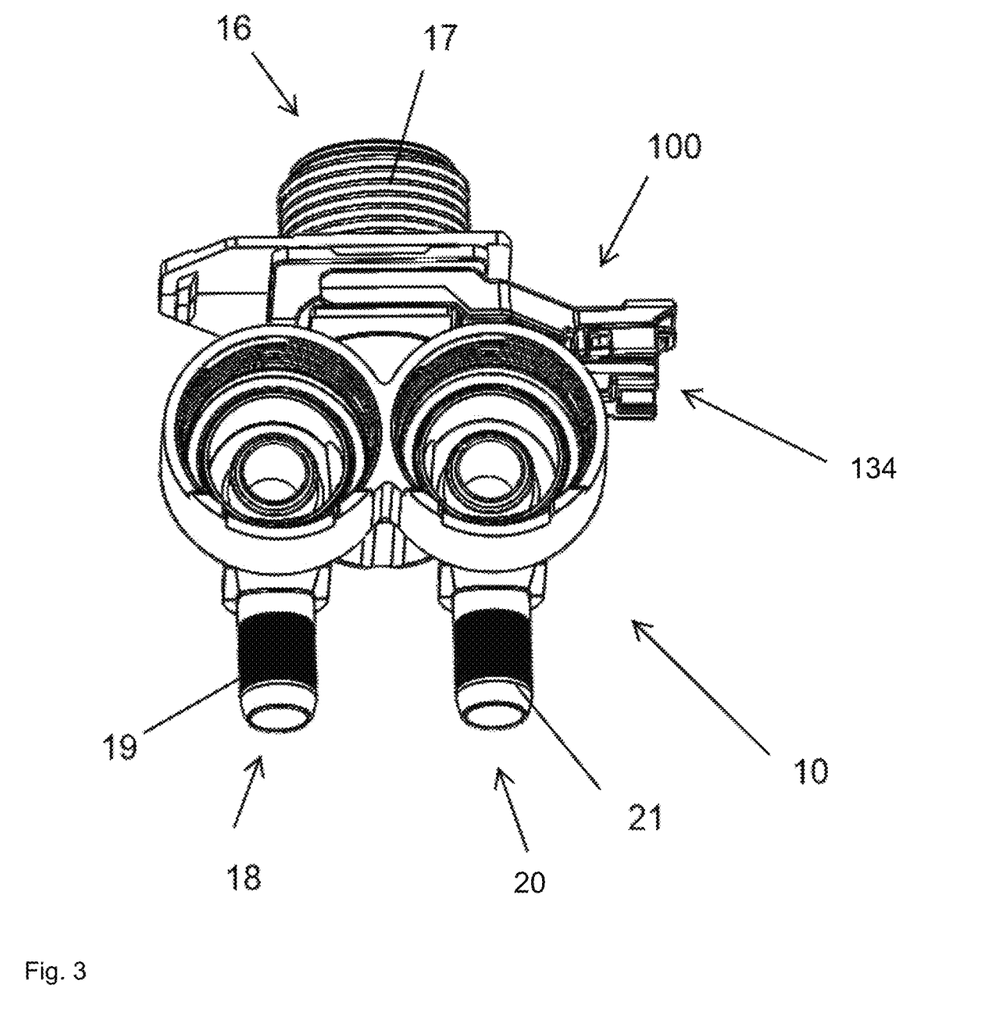
FIG. 3 is a top view of the inlet valve of FIG. 1 with the flowmeter arranged in a first orientation.

The symmetric arrangement of brackets 54, 56 on annular outer surface 37 allows to insert coupling elements 114, 116 into the respective eyelet from either side of brackets 54, 56. Thereby, in the preferred embodiment, flowmeter 100 can be selectively attached to valve assembly 10 in either one of a first and a second orientation. The first orientation is depicted in FIGS. 1, 3 and 6, the second orientation is depicted in FIGS. 2, 5, 7 and 8. In FIGS. 1 through 7, an orientation of flowmeter 100 with respect to valve assembly 10 is defined by an orientation of the axis of symmetry of flowmeter 100 in a plane perpendicular to a flow axis of fluid path 14 that extends coaxially through and is enclosed by wall section 36. This plane coincides with a plane of rotation of an impeller 40, which will be described later. As can be inferred from the comparison of FIGS. 1, 3 and 6 with FIGS. 2, 5, 7 and 8 the first and second orientation are spaced from each other at a 180° separation in this plane. In other preferred embodiments, inlet valve V is configured such that flowmeter 100 can be selectively attached to valve assembly in more than two orientations. In a particularly preferred embodiment, valve assembly 10 comprises two pairs of brackets, i.e. four brackets, evenly spaced around annular outer surface 37. In such embodiments, flowmeter 100 is configured such that first and second coupling element 114, 116 can be selectively coupled either one of the pairs of brackets. In other words, in such embodiments, flowmeter 100 is selectively attachable to valve assembly 10 in either one of a first, a second, a third and a fourth orientation. By adapting the number and spacing of brackets spaced around annular outer surface 37, the number of available orientations can be chosen as desired. A potential advantage of being able to choose from different orientations when attaching flowmeter 100 is readily apparent from FIGS. 2 and 3. Inlet valve V may be adapted to the packaging constraints of different washing machine by arranging flowmeter 100 in a suitable orientation, in particular by choosing the orientation of connection portion 110. Thus, inlet valve V is not limited to use in a particular type of washing machine but may be employed over different types and series with only minor modifications, if any.

Now turning to FIGS. 5, 6 and 7, valve assembly 10 comprises a flow rate indicator 22 configured to provide a quantity indicative of the fluid flow rate through fluid path 14. In the embodiment of FIGS. 1 to 8, flow rate indicator 22 comprises an impeller 40 placed in flow path 14 perpendicular to the direction of the fluid flow. A first magnet 24 and a second magnet 26 are arranged on opposing vanes of impeller 40. By virtue of the attachment of coupling portion 104 to counter-coupling portion 26, flowmeter 100 is positioned such that sensor 108 lies in the plane of rotation of impeller 40 and thus magnets 24, 26. Sensor 108 in the depicted embodiment is a hall sensor, detecting a magnetic field of magnets 24, 26 passing underneath sensor 108 to determine the rotation rate of impeller 40, and thus allow circuitry 131 and/or the control unit of the washing machine to determine the fluid flow rate in fluid path 14. In other words, the detectable quantity in the depicted embodiment is a magnetic field.

For reliably detecting a magnetic field, hall sensors require to be placed at a particular distance relative to the source of the magnetic field, i.e. magnets 24, 26 of impeller 40. As depicted for example in FIGS. 6, 7 and 8, mating surface 112 of housing 102 is in contact with abutting surface 30. The wall thickness of housing 102 at mating surface 112 and the wall thickness of section 36 at abutting surface 30 spaces sensor 108 at a predetermined distance from impeller 40. In preferred embodiments, coupling portion 104 is configured to bias mating surface 112 against abutting surface 30. In the particularly preferred embodiment of FIGS. 1 to 8, the dimensions of coupling elements 114, 116 is chosen such that, when flowmeter 100 is attached to valve assembly 10, a pulling force is exerted by locking lugs 152a, 152b, 154a, 154b so as to press mating surface 112 against abutting surface 30. In particularly preferred embodiments, the pulling force is a result of elastic stretching of coupling elements 114, 116. Thereby, the risk that mating surface 112 separates from abutting surface 30, thereby increasing the distance of sensor 108 to impeller 40 and thus magnets 24, 26 can be reduced, even under increased vibrational loading. In other words, the present invention may increase the reliability of the flow rate measurement, since the predetermined distance is maintained with increased probability. The predetermined distance is chosen according to the type of magnet used. In some embodiments, the predetermined distance is configured for use of ferrite magnets. In other embodiments, the predetermined distance is configured for use of rare earth metal magnets, such as neodymium magnets. In particularly preferred embodiments, the predetermined distance is a mean value between a predetermined distance for ferrite magnets and a predetermined distance for rare earth metal magnets, such as neodymium magnets. Thus, the present invention may be used with rare earth metal magnets, such as neodymium magnets, as well as ferrite magnets without having to change the dimensions of either flowmeter 100 or valve assembly 10.

In other embodiments, flow rate indicator 22 comprises one, three, four, five, six or more magnets. Increasing the number of magnets can increase the time resolution of the flow rate measurement. In preferred embodiments, the magnets of impeller 40 are radially aligned, i.e. a first pole of a respective magnet is oriented radially inward and a second pole of the respective magnet is oriented radially outward. In particularly preferred embodiments, the magnets of impeller 40 are disposed along a circumferential direction of impeller 40 at alternating polarity, as for example depicted in FIG. 5. First magnet 24 is arranged such that a south pole S is oriented radially outward and a north pole N is oriented radially inward, and second magnet 26 is arranged such that a north pole N is oriented radially outward and a south pole S is oriented radially inward. An alternating polarity is particularly preferred as the resulting polarity change of the magnetic when subsequent magnets pass under sensor 108 may be employed to increase sensitivity and/or reliability of the flow rate measurement. In other embodiments, the magnets of impeller 40 disposed along a circumferential direction of impeller 40 with each magnet having the same orientation, i.e. the magnets are aligned such that the radially outward facing poles are of the same polarity.

REFERENCE SIGNS 10 valve assembly
12 valve body
14 fluid path
14a first branch of flow path 14
14b second branch of flow path 14
15 junction
16 inlet duct
17 cylindrical protrusion forming inlet duct 16
18 first outlet duct
19 cylindrical protrusion forming first outlet duct 18
20 second outlet duct
21 cylindrical protrusion forming second outlet duct 20
22 flow rate indicator
24 first magnet
26 second magnet
28 counter-coupling portion
30 abutting surface
36 wall section
37 annular outer surface of wall section 36
38 first valve seat
39 second valve seat
40 impeller
50 upstream wall segment
52 downstream wall segment
54 first bracket
56 second bracket
58 eyelet of bracket 56
59, 60 indent
100 flowmeter
102 housing
104 coupling portion
106 sensor arrangement
108 sensor
110 connection section
112 mating surface
114 first coupling element of coupling portion 104
114a connection portion of coupling element 114
114b retaining portion of coupling element 114
116 second coupling element of coupling portion 104
116a connection portion of coupling element 116
116b retaining portion of coupling element 116
120 first leg of coupling portion 104
120a base portion of leg 120
120b extension portion of leg 120
122 second leg of coupling portion 104
122a base portion of leg 122
122b extension portion of leg 122
124 receiving portion
128 contact terminals
130 circuit board
131 circuitry
132 encapsulated section
134 socket
135 circuit section of circuit board 130
136 contact section of circuit board 130
138 support structure
138a circuitry portion of support structure 138
138b terminal portion of support structure 138
140 flowmeter housing
142 first leg of support structure 138
142a base portion of leg 142
142b extension portion of leg 142
144 second leg of support structure 138
144a base portion of leg 144
144b extension portion of leg 144
150a first prong of retaining portion 114b
150b second prong of retaining portion 114b
151a slit between prongs 150a, 150b
152a locking lug of prong 150a
152b locking lug of prong 150b
153a chamfered front end of locking lug 152a
153b chamfered front end of locking lug 152b
154a first prong of retaining portion 116b
154b second prong of retaining portion 116b
155a back end of locking lug 152a
155b back end of locking lug 152b
156a locking lug of prong 154a
156b locking lug of prong 154b
IF inflow stream
N north pole of respective magnet 24, 26
OF1 first outflow stream
OF2 second outflow stream
S south pole of respective magnet 24, 26
V inlet valve

The invention claimed is:

1. Flowmeter for determining a fluid flow rate through an associated valve assembly, the flowmeter being an entity separate from and removably attachable to the associated valve assembly, the flowmeter comprising:
   a housing;
   a sensor arrangement disposed in the housing, the sensor arrangement comprising at least one sensor configured to detect a quantity provided by a flow rate indicator of the valve assembly, the quantity being indicative of the fluid flow rate through a fluid path of the valve assembly; and
   a coupling portion provided at the housing and configured to couple with an associated counter-coupling portion of the valve assembly for attaching the flowmeter to the valve assembly in an orientation with respect to the valve assembly selectable from a group comprising at least a first orientation and a second orientation.

2. Flowmeter of claim 1, wherein the coupling portion is configured to removably couple with the associated counter-coupling portion of the valve assembly.

3. Flowmeter of claim 1, wherein the at least one sensor is arranged in an encapsulated section of the housing.

4. Flowmeter of claim 1, wherein the housing comprises a mating surface and the coupling portion is configured such that, when the flowmeter is coupled to the valve assembly in an orientation selectable from the group comprising at least the first and second orientation, the mating surface engages a respective abutting surface of the valve assembly.

5. Flowmeter of claim 4, wherein the coupling portion is configured such that, when the flowmeter is coupled to the valve assembly in an orientation selectable from the group comprising at least the first and second orientation, the coupling portion biases the mating surface against a respective abutting surface of the valve assembly.

6. Flowmeter of claim 1, wherein the coupling portion comprises at least a first coupling element and a second coupling element, wherein each of the at least first and second coupling element is configured to engage a counter-coupling element selectable from at least a first counter-coupling element and a second counter-coupling element of the counter-coupling portion of the valve assembly so as to secure the flowmeter in an orientation selectable from the group of orientations.

7. Flowmeter of claim 1, wherein the coupling portion and/or the sensor arrangement is integrally formed with the housing.

8. Flowmeter of claim 1, wherein:
the quantity indicative of the fluid flow rate through the valve assembly is a magnetic field provided by a magnetic portion of a flow rate indicator rotating in the valve assembly, the magnetic field being detectable by the at least one sensor of the sensor arrangement; and
when the flowmeter is coupled to the valve assembly in an orientation selectable from the group of orientations, the at least one sensor is provided at a predetermined distance from the valve assembly which is suitable for detecting the magnetic field provided by the magnetic portion comprising ferrite as well as the magnetic field provided by the magnetic portion comprising a rare earth metal.

9. Flowmeter of claim 8, wherein the at least one sensor of the sensor arrangement is a hall sensor.

10. Flowmeter of claim 8, wherein the rare earth metal is neodymium.

11. Valve assembly comprising:
a valve body comprising at least one inlet duct, at least one outlet duct and a fluid path connecting the at least one inlet duct and the at least one outlet duct;
at least one valve configured to control a fluid flow rate through the fluid path;
a flow rate indicator configured to provide a quantity indicative of the fluid flow rate through the fluid path, the quantity being detectable by a sensor of an associated flowmeter, wherein the flowmeter is an entity separate from and removably attachable to the valve assembly; and
a counter-coupling portion configured to couple with an associated coupling portion of the flowmeter for coupling the flowmeter to the valve assembly in an orientation with respect to the valve assembly selectable from a group comprising at least a first orientation and a second orientation.

12. Valve assembly of claim 11, wherein the counter-coupling portion is configured to removably couple with the associated coupling portion of the flowmeter.

13. Valve assembly of claim 11, wherein the counter-coupling portion is provided at an annular outer surface of a wall section of the valve body which encloses the fluid path.

14. Valve assembly of claim 11, wherein the counter-coupling portion comprises at least a first counter-coupling element and a second counter-coupling element, each of the at least first and second counter-coupling element being configured to engage a coupling element selectable from at least a first coupling element and second coupling element of the coupling portion of the flowmeter, to secure the flowmeter to the valve assembly in an orientation selectable from the group of orientations.

15. Valve assembly of claim 11, wherein each orientation of the group of the at least first and second orientation is located in a common plane perpendicular to a flow axis defined by the fluid path.

16. Valve assembly of claim 15, wherein the first and second orientation form a 180° angle in the common plane.

17. Inlet valve for a household appliance, the inlet valve comprising a valve assembly as defined in claim 11 and further comprising the flowmeter for determining the fluid flow rate through the associated valve assembly, the flowmeter comprising
a housing;
a sensor arrangement disposed in the housing, the sensor arrangement comprising at least one sensor configured to detect the quantity indicative of the fluid flow rate through the valve assembly; and
the coupling portion provided at the housing and configured to couple with the associated counter-coupling portion of the valve assembly for attaching the flowmeter to the valve assembly in the orientation with respect to the valve assembly selectable from the group comprising at least the first orientation and the second orientation.

18. Inlet valve of claim 17, wherein the household appliance is a washing machine.

19. Household appliance comprising the valve assembly as defined in claim 11, and the flowmeter for determining the fluid flow rate through the associated valve assembly and being attached to the valve assembly in the orientation selectable from at least the first orientation and the second orientation, the flowmeter comprising:
a housing;
a sensor arrangement disposed in the housing, the sensor arrangement comprising at least one sensor configured to detect the quantity indicative of the fluid flow rate through the valve assembly; and
the coupling portion provided at the housing and configured to couple with the associated counter-coupling portion of the valve assembly for attaching the flowmeter to the valve assembly in the orientation with respect to the valve assembly selectable from the group comprising at least the first orientation and the second orientation.

20. Household appliance of claim 19, wherein the household appliance is a washing machine.

* * * * *